United States Patent
Yamamoto

(10) Patent No.: US 9,384,377 B2
(45) Date of Patent: Jul. 5, 2016

(54) RFID TAG WRITING SYTEM AND METHOD FOR WRITING DATA IN RFID TAG

(71) Applicant: Toshiba Tec Kabushiki Kaisha, Tokyo (JP)

(72) Inventor: Kenta Yamamoto, Shizuoka (JP)

(73) Assignee: Toshiba Tech Kabushiki Kaisha, Tokyo (JP)

( * ) Notice: Subject to any disclaimer, the term of this patent is extended or adjusted under 35 U.S.C. 154(b) by 289 days.

(21) Appl. No.: 13/957,358

(22) Filed: Aug. 1, 2013

(65) Prior Publication Data

US 2014/0035734 A1 Feb. 6, 2014

(30) Foreign Application Priority Data

Aug. 2, 2012 (JP) ................. 2012-171896

(51) Int. Cl.
*G06K 7/10* (2006.01)
(52) U.S. Cl.
CPC .................. *G06K 7/10198* (2013.01)
(58) Field of Classification Search
CPC ............ G06K 7/10198; G06K 7/0008; G06K 19/0723; G06K 17/00; G06K 7/10336; G07C 9/00111
USPC ................ 340/10.1, 10.2, 10.3, 10.31, 10.32, 340/10.33, 10.34, 10.4, 10.41, 10.42, 10.5, 340/10.51, 10.52
See application file for complete search history.

(56) References Cited

U.S. PATENT DOCUMENTS

| | | | | |
|---|---|---|---|---|
| 5,745,847 A | * | 4/1998 | Matsuo | 455/234.1 |
| 2002/0070862 A1 | * | 6/2002 | Francis et al. | 340/572.1 |
| 2006/0029399 A1 | * | 2/2006 | Park et al. | 399/12 |
| 2006/0033607 A1 | * | 2/2006 | Bellantoni | G06K 7/0008 340/10.1 |
| 2006/0139662 A1 | | 6/2006 | Sugiyama | |
| 2006/0267733 A1 | * | 11/2006 | Steinke et al. | 340/10.1 |
| 2008/0074267 A1 | * | 3/2008 | Sugiyama | 340/572.1 |
| 2011/0193958 A1 | * | 8/2011 | Martin | H04N 7/181 348/143 |

FOREIGN PATENT DOCUMENTS

| | | |
|---|---|---|
| JP | H06290321 A | 10/1994 |
| JP | 2006072557 A | 3/2006 |
| JP | 2006163761 A | 6/2006 |

(Continued)

OTHER PUBLICATIONS

Japanese Office Action dated Dec. 24, 2013, filed in Japanese counterpart Application No. 2012-171896, 12 pages (with translation).

*Primary Examiner* — Jennifer Mehmood
*Assistant Examiner* — Yong Hang Jiang
(74) *Attorney, Agent, or Firm* — Patterson & Sheridan, LLP

(57) ABSTRACT

An RFID tag writing system has an antenna configured to transmit a write signal towards plural RFID tags and receive response signals generated by the RFID tags in response to the write signal, and a controller configured to control the antenna. The controller includes a mode setting unit configured to set a mode of the RFID writing system as either a manual mode or an auto mode, a manual setting unit configured to allow a user of the RFID tag writing system to determine a receiving condition according to which the response signals are to be processed or a writing condition according to which the write signal is to be transmitted to the RFID tags, if the manual mode is set by the mode setting unit, and an auto setting unit configured to determine the receiving condition or the writing condition if the auto mode is set by the mode setting unit.

9 Claims, 6 Drawing Sheets

(56) References Cited

FOREIGN PATENT DOCUMENTS

| | | |
|---|---|---|
| JP | 2006-181800 | 7/2006 |
| JP | 2008077500 A | 4/2008 |
| JP | 2010134675 A | 6/2010 |
| JP | 2010536189 A | 11/2010 |

* cited by examiner

FIG.7

| LABEL ITEM NUMBER | GAIN SETTING VALUE P | TRANSMISSION POWER S | POSITION VALUE F |
|---|---|---|---|
| LABEL 1 | 8 | 6 | 6mm |
| LABEL 2 | 9 | 5 | 12mm |
| LABEL 3 | 7 | 5 | 9mm |
| ⋮ | ⋮ | ⋮ | ⋮ |
| LABEL N | 7 | 5 | 9mm |

RFID TAG WRITING SYTEM AND METHOD FOR WRITING DATA IN RFID TAG

CROSS-REFERENCE TO RELATED APPLICATION

This application is based upon and claims the benefit of priority from Japanese Patent Application No. 2012-171896, filed Aug. 2, 2012, the entire contents of which are incorporated herein by reference.

FIELD

Embodiments described herein relate to a RFID tag writing system configured to write data in a RFID tag and a method for writing data in the RFID tag.

BACKGROUND

An RFID (Radio Frequency Identification) label or tag is capable of being read and written in a non-contact manner and resistant to the influence of dirt and dust. Thus, RFID technology is continuously used as a substitute for barcode technologies.

However, there is a demand to use both barcodes and RFID tags practically in stores. To meet such a demand, a RFID tag writing system is provided which is capable of printing basic commodity data such as a commodity name, a price, and a barcode on a label and writing the basic data and other detailed data in a RFID tag embedded in the label.

In a conventional calibration carried out in a RFID writing system, the setting of electromagnetic wave transmission power of and optimal writing position for RFID labels having different features is relatively cumbersome and needs to be manually done by professionals using special tools. Thus, normal users cannot conduct the calibration.

Hence, an automatic calibration device is provided to solve the problem above. The automatic calibration device calculates an optimal writing position by conveying RFID labels by a specific feeding distance. However, the feeding of a whole label takes a long time, and the transmission power of an electromagnetic wave and a dynamic range of an AGC (Automatic Gain Control) unit at a receiving side are not taken into consideration. Thus, the following problems are encountered.

Even though an optimal writing position is calculated through the calibration, if the electromagnetic wave output from a RFID reader-writer is too powerful, the electromagnetic wave will flow through a RFID tag embedded in another label also. Consequentially, the RFID reader-writer receives a response from a plurality of RFID tags. In this case, data are not written to a target RFID tag to which data is to be written or the same information is written to a plurality of RFID tags. In addition, an optimal writing position may not be found if the intensity of the electromagnetic wave output from a RFID reader-writer is too weak. As a result, there is still a problem that optical writing parameters may not be set even if the conventional automatic calibration is carried out.

In addition, in practical use, as the same calibration values are effective for RFID labels having the same specification, in most cases, it may be unnecessary to carry out an automatic calibration.

On the other hand, there is a problem that it cannot be determined whether or not a manually-set calibration value is appropriate without writing data in the RFID tag even if the calibration value is slightly shifted from the originally-set value.

BRIEF DESCRIPTION OF THE DRAWINGS

FIG. 7 is an example of a calibration value database according to the embodiment.

DETAILED DESCRIPTION

According to one embodiment, an RFID tag writing system has an antenna configured to transmit a write signal towards plural RFID tags and receive response signals generated by the RFID tags in response to the write signal, and a controller configured to control the antenna. The controller includes a mode setting unit configured to set a mode of the RFID writing system as either a manual mode or an auto mode, a manual setting unit configured to allow a user of the RFID tag writing system to determine a receiving condition according to which the response signals are to be processed or a writing condition according to which the write signal is to be transmitted to the RFID tags, if the manual mode is set by the mode setting unit, and an auto setting unit configured to determine the receiving condition or the writing condition if the auto mode is set by the mode setting unit.

Embodiments are described in detail below with reference to accompanying drawings of FIG. 1 to FIG. 7.

Figure 1:
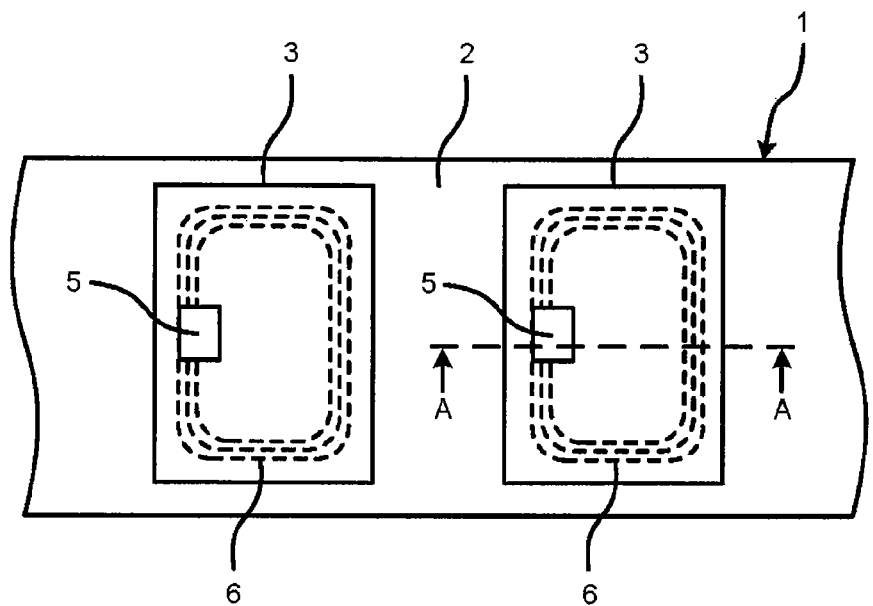
FIG. 1 is a schematic diagram of an example of a RFID label paper.
Figure 2:
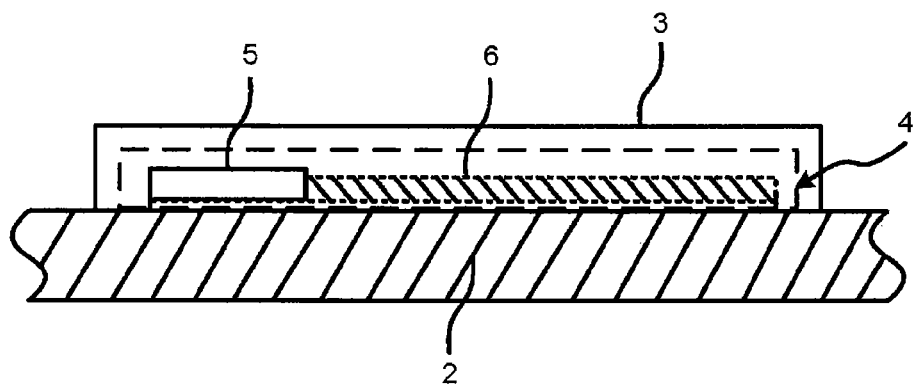
FIG. 2 is an enlarged cross-sectional view of the section along line A-A shown in FIG. 1.

The RFID label paper 1 used in the present embodiment is described first with reference to FIG. 1 and FIG. 2.

As shown in FIG. 1, a RFID label paper 1 includes a strip-shaped mount 2 and a plurality of RFID labels 3 which are orderly arranged along one row in a longitudinal direction of the mount 2 and affixed on the surface of the mount 2 in a freely separable manner. As shown in FIG. 2, which is an enlarged view of the section of a line A-A shown in FIG. 1, in each RFID label 3, a RFID tag 4 (or RFID inlet) is contained in the back side (the side contacted with the mount 2) of a label sheet. The RFID tag 4 is formed by arranging an IC chip 5 and an antenna 6 in a film. Moreover, the surface of the RFID label 3 is a surface on which visible information is printed.

A power source generating section, a demodulating section, a modulation section, a memory section, and a control section for controlling the aforementioned sections are arranged in the IC chip 5 of the RFID tag 4. The power source generating section supplies power for each section of the IC chip 5 by rectifying and stabilizing a signal corresponding to an electric wave received by the antenna 6. The demodulating section demodulates the signal corresponding to the electric wave received by the antenna 6 and sends the demodulated signal to the control section. The modulation section modulates the data sent from the control section and sends a signal from the antenna 6. The control section writes the data demodulated by the demodulating section to the memory section or sends the data read from the memory section in the modulation section.

The memory section includes a setting area in which data is unrewritably recorded and a user area to which any data can be written. Moreover, an ID code is written in the setting area in advance, and the ID code is a specific code of the RFID tag 4 set for separately identifying each RFID tag 4.

Next, a RFID tag writing system is described with reference to FIG. 3-FIG. 5, and in the RFID tag writing system, tag data is written in RFID tags 4 of the RFID labels 3 that is included in the RFID label paper 1 orderly conveyed, using a wireless communication in a non-contact manner, and also label printing data is printed on the surface (printing surface) of the RFID label 3.

Figure 3:
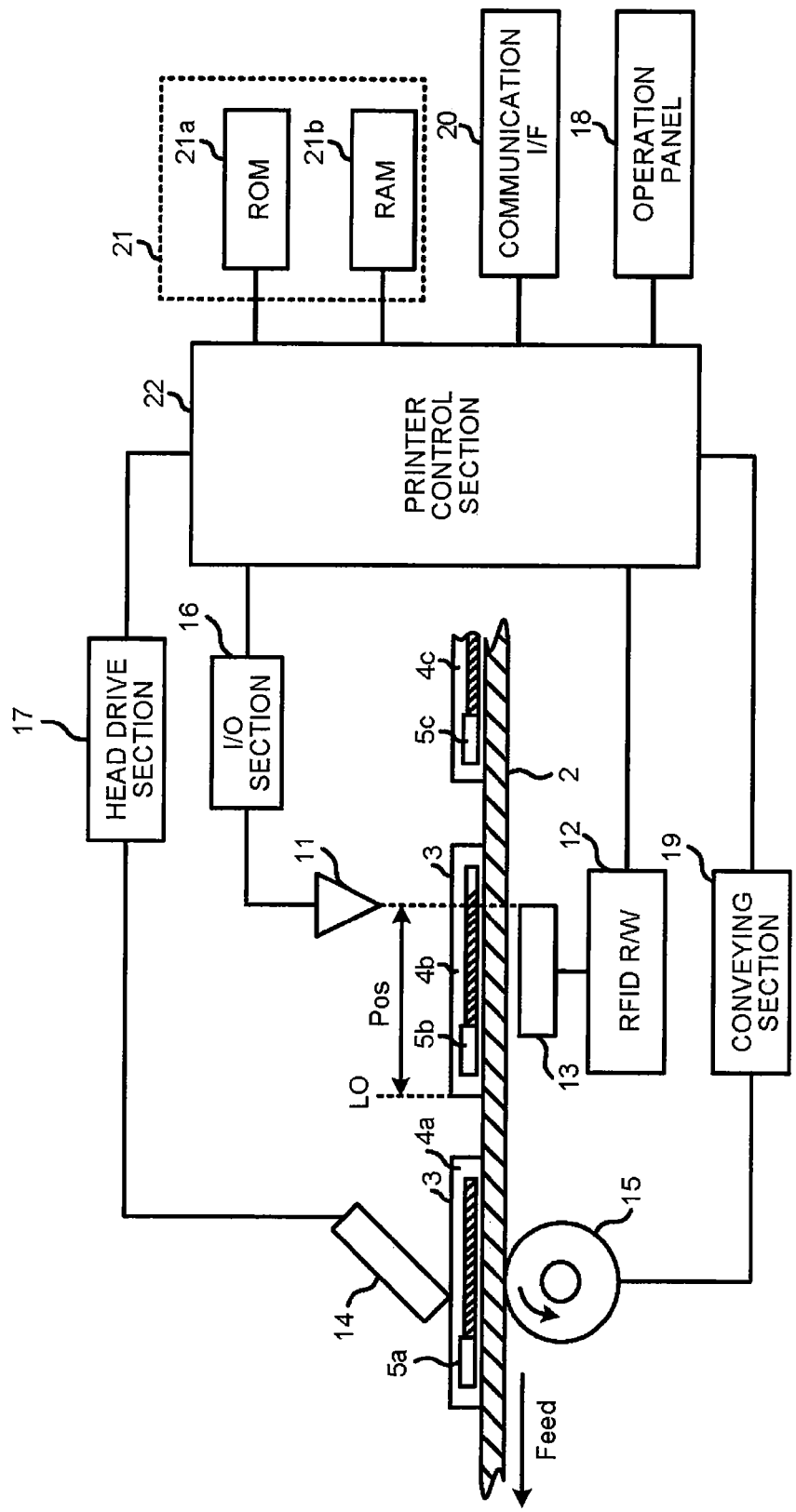
FIG. 3 is a block diagram illustrating a configuration of an RFID tag writing system according to an embodiment.

FIG. 3 is a block diagram showing a structure of a RFID tag writing system. For the RFID tag writing system, a RFID label paper 1 is placed on a label holder (not shown) in a rolled state. Moreover, the front end of the RFID label paper 1 is drawn out from the label holder and guided to a peeling section (not shown) along a specific conveyance path. In the peeling section, the RFID label 3 is peeled off from the mount 2. The RFID label 3 peeled off at the peeling section is discharged from a label outlet (not shown). The mount 2, from which the RFID label 3 is peeled off, is rolled up by a winding roller (not shown).

On the conveyance path from the label holder to the peeling section, a label sensor 11, the antenna 13 of the RFID reader-writer 12, and a printing head 14 are sequentially set from an upstream end of a conveyance direction (the feed direction shown in FIG. 3) (the end at which the label holder is provided) of the RFID label paper 1 with respect to the peeling section. The label sensor 11 and the printing head 14 are arranged above the conveyance path. To the contrary, the antenna 13 is arranged below the conveyance path. Further, a platen roller 15 is arranged at a position facing the printing head 14, and the conveyance passage is formed between them. Further, the antenna 13 may be arranged above the conveyance path.

The label sensor 11 detects the RFID label 3 arranged in the RFID label paper 1 drawn out from the label holder. For example, the label sensor 11 detects the RFID label 3 by optically detecting the edge of the front end of the RFID label 3 in the conveying direction. A detection signal is provided to a printer control section 22, which will be described later, through an I/O unit 16. The edge of the front end is set as a label origin LO, and the position of the RFID label 3 is defined based on a position value Pos representing a distance from the label origin LO.

The antenna 13, which is arranged at a position nearest to the conveyance surface of the conveyance path, transmits an electric wave (or electromagnetic wave) and receives response waves generated at the RFID tags 4 (three successive RFID tags exemplarily denoted by symbols 4a, 4b, and 4c in FIG. 3) receiving the electric wave (or electromagnetic wave). Moreover, the antenna 13 has powerful directivity towards the conveyance surface directly above the antenna 13 (or directly beneath the antenna 13 when the antenna 13 is arranged above the conveyance path). The RFID reader-writer 12 writes the tag data into and reads the tag data from the RFID tag 4 existing in the mutual communication area of the electric wave (or electromagnetic wave) sent by the antenna 13. These reading and writing will be described later in detail.

The printing head 14, which is, for example, a thermal head, is driven by a head drive unit 17 to print various kinds of visible information on the surface of the RFID label 3 positioned above the platen roller 15. Here, the printing head 14 and the head drive unit 17 constitute a printing unit. Further, an ink ribbon may be inserted between the printing head 14 and the RFID label 3.

Further, the RFID tag writing system comprises an operation panel 18, a conveying section 19, a communication interface 20, a memory 21, and a printer control section 22.

Various keys and a display unit are arranged on the operation panel 18 to set and calibrate various parameters.

The conveying section 19 functions as a drive source of a RFID label paper conveyance system of the platen roller 15 and the winding roller. The RFID label paper 1 is conveyed due to the function of the conveying section 19 along the conveyance path.

A host device, such as a personal computer, is connected to the communication interface 20 through a communication line. Moreover, a RFID label issuing job including writing the tag data to the RFID tag 4 of the RFID label 3 and printing label printing data (e.g. words) printed on the printing surface of the RFID label 3 is sent from the host device. The RFID label issuing job received from the host device is stored and kept in the memory 21 before the job is finished. Further, the memory 21 is divided into a ROM area 21a dedicated for reading and a RAM area 21b which can be accessed randomly, and memory areas needed for the control of the printer, such as an area for temporarily storing the tag data edited based on the RFID label issuing job received from the host device and an area in which the image of label printing data is developed, are formed in the memory 21. Additionally, various parameters are set and calibrated by the host device, like the operation panel 18.

Figure 4:
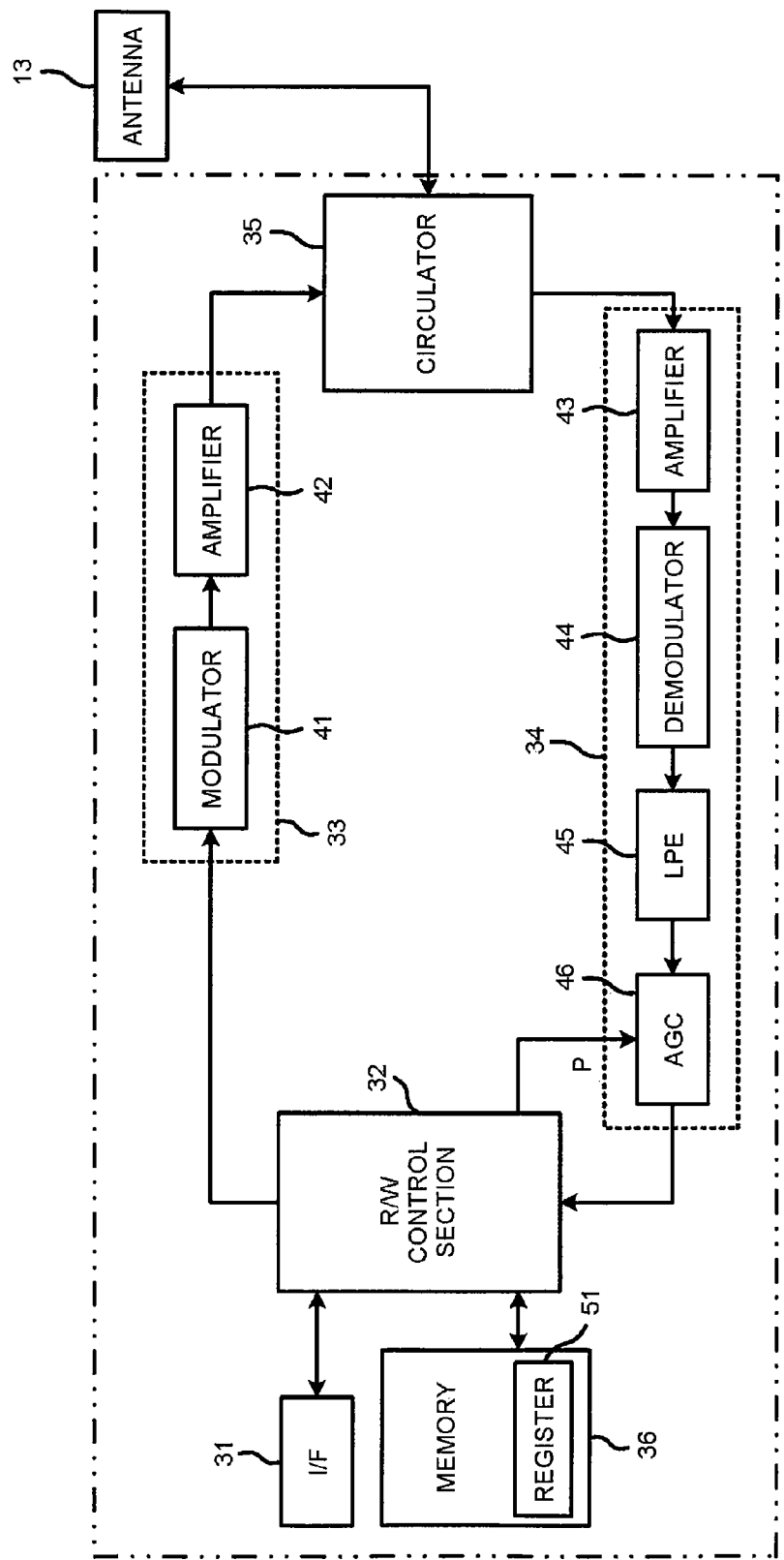
FIG. 4 is a block diagram illustrating a configuration of an RFID reader-writer in the RFID tag writing system according to the embodiment.

FIG. 4 is a block diagram showing a configuration of the RFID reader-writer 12. The RFID reader-writer 12 includes a printer control section 22, an interface 31 connected to the printer control section 22, a reader-writer control section 32, a sending processing section 33, a receiving processing section 34, a circulator 35 and a memory 36.

The sending processing section 33 includes a modulator 41 for modulating a specific conveyance wave using an analog data write signal output from the reader-writer control section 32 and an amplifier 42 for amplifying the signal modulated by the modulator 41. The signal amplified by the amplifier 42 is supplied to the antenna 13 through the circulator 35 and emitted from the antenna 13 as an electric wave (or electromagnetic wave). The circulator 35 has the following functions: outputting the signal input from the sending processing section 33 to the antenna 13, and outputting the signal input from the antenna 13 to the side of the receiving processing section 34. A signal corresponding to the electric wave (or electromagnetic wave) received from RFID tags 4 existing in the mutual communication area is provided from the antenna 13 to the circulator 35.

The receiving processing section 34 includes an amplifier 43 for amplifying response data signal input from the circulator 35, a demodulator 44 for eliminating s specific conveyance wave component from the signals amplified by the amplifier 43 to demodulate the response analog data signal; a LPF (Low Pass Filter) 45 through which a specific low-frequency signal component of the response data signal demodulated by the demodulator 44 passes, and an AGC circuit 46 for adjusting gain (amplification ratio) by changing an intensity of the response data signal passing through the LPF 45 to a fixed appropriate intensity. The response data signal adjusted by the AGC circuit 46 to have the appropriate intensity is provided to the reader-writer control section 32.

The reader-writer control section 32 has the following functions: generating a data write signal according to a command from the printer control section 22 connected via the interface (I/F) 31, providing the sending processing section 33 with the generated data write signal, converting the response data signal provided by the receiving processing section 34 to data that can be recognized by the printer control section 22, and providing the converted data to the printer control section 22 through the interface 31. The reader-writer control section 32 further has the following functions: generating an AGC parameter P by which the gain of the AGC circuit 46 can be changed so that the intensity of the response data signal input from the AGC circuit 46 is at an appropriate level, and providing the generated AGC parameter P to the AGC circuit 46.

The memory 36 has a ROM area dedicated for reading and a RAM area which can be accessed randomly. Moreover, a program (firmware) for controlling actions of the reader-writer control section 32 is stored in the ROM area. Further, a first-in-first-out (FIFO) function is provided in the RAM area.

Moreover, the AGC parameter P to be provided to the AGC circuit 46 from the reader-writer control section 32 is written in a register 51 sequentially. At this time, the reader-writer control section 32 generates an AGC parameter P to change the gain of the AGC circuit 46 so that the intensity of the data signal provided by the AGC circuit 46 is at an appropriate level. Then, the AGC parameter P is provided to the AGC circuit 46 and written in the register 51. In this way, a response data signal generated in response to a data write signal by which data writing is successfully performed is adjusted by the AGC circuit 46 to have a proper level and is input to the reader-writer control section 32. Moreover, the data signal is converted to data that can be recognized by the printer control section 22 and provided to the printer control section 22 through the interface 31.

Here, the AGC parameter P is described further. As stated above, the antenna 13 of the RFID reader-writer 12 is arranged in the RFID label printer at a position nearest to the conveyance surface of the conveyance path for conveying the RFID label paper 1. Besides, the antenna 13 has a powerful directivity towards the conveyance surface directly above it. For this reason, the intensity of the response signal (response wave) received from the RFID tag 4 which has a normal wireless output level becomes higher, and therefore a distortion occurs easily. To avoid the distortion, the AGC circuit 46 is inserted and the intensity of the response signal is reduced to an appropriate level. Consequentially, the value of the AGC parameter P provided to the AGC circuit 46 is greater with respect to the response signal received from the RFID tag 4 which has the normal wireless output level. To the contrary, with respect to the response signal received from the RFID tag 4 which has a lower wireless output level than the normal value, the value of the AGC parameter P becomes lower in proportion to the wireless response output level of the RFID tag 4, because the intensity of the receiving signal is lower. Therefore, the intensity of the response signal received from the RFID tag 4 can be estimated by referring to the AGC parameter P.

Figure 5:
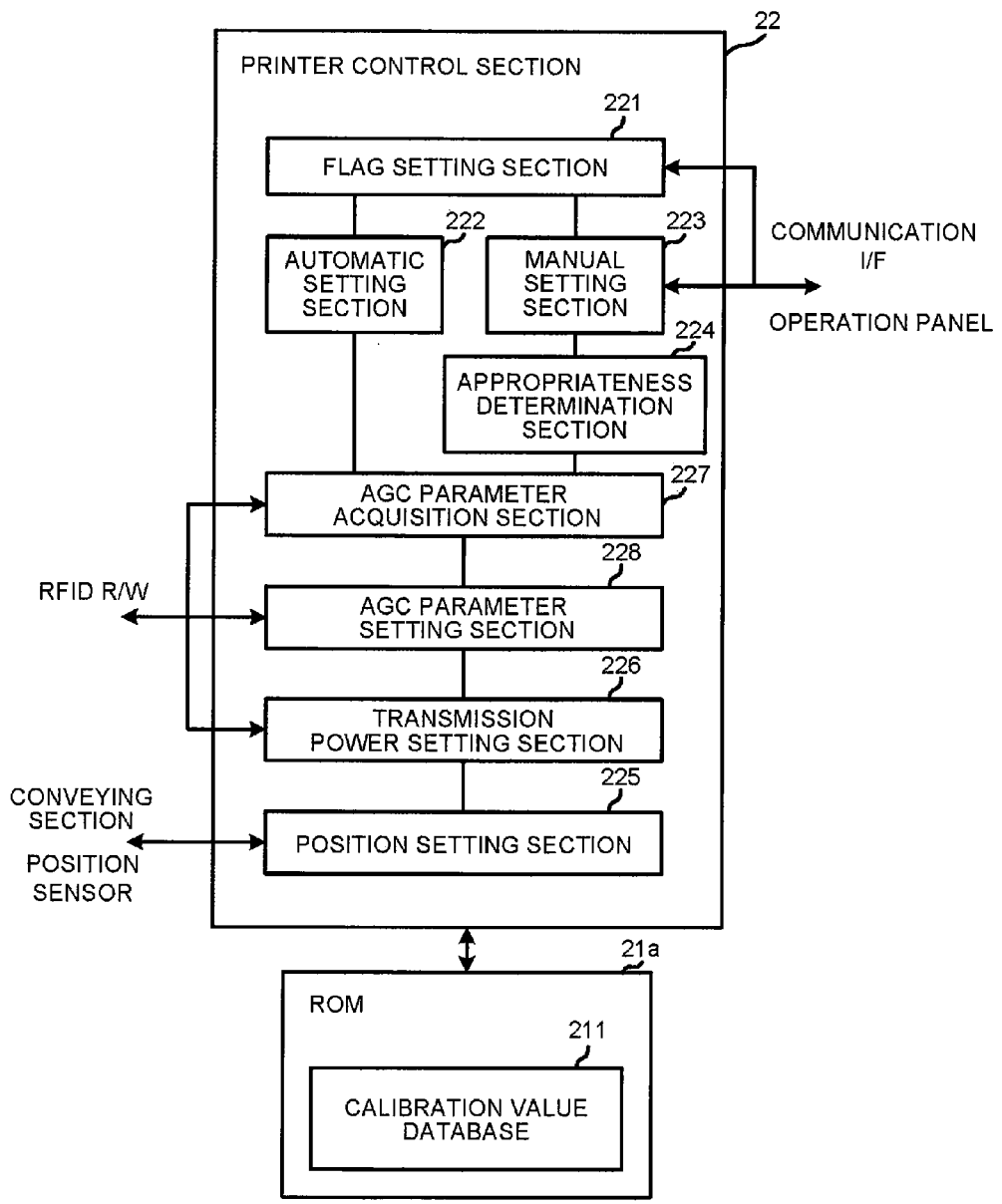
FIG. 5 is a diagram illustrating the configuration of a printer control section of the RFID tag writing system according to the embodiment.

FIG. 5 is a diagram showing a configuration of the printer control section 22. The printer control section 22 comprises a flag setting section 221, an automatic setting section 222, a manual setting section 223, an appropriateness determination section 224, a position setting section 225, a transmission power setting section 226, an AGC parameter acquisition section 227 and an AGC parameter setting section 228. Further, functional blocks of the above-mentioned sections are stored in the ROM area 21a in the form of firmware 211. A calibration value database 211 indicating calibration values with respect to each of label item numbers is stored in the ROM area 21a.

The flag setting section 221 sets a calibration flag for indicating whether or not the calibration value calculated through an automatic calibration is to be used. The calibration flag can be set by a host device or the operation panel 18 connected with a communication interface 20.

When the calibration flag is on, the automatic setting section 222 sets the calibration value calculated through the automatic calibration as a calibration value.

On the other hand, when the calibration flag is off, the manual setting section 223 allows the calibration value including at least one of an AGC parameter value, a position value, and a transmission power value input from a host device or the operation panel connected with the communication interface 20 to be manually set. In the present embodiment, an AGC parameter value, a position value, and a transmission power value are assumed to be set manually.

Moreover, when the calibration value is set manually, the appropriateness determination section 224 determines whether or not the calibration value is appropriate for the reading and writing of the RFID tag 4.

When the appropriateness determination is carried out by the appropriateness determination section 224, the position setting section 225 controls the platen roller 15 to convey the RFID label 3 to a manually set position value Pos.

The transmission power setting section 226 sets a transmission power level to be a specific value in the position corresponding to the manually set position value Pos. Further, if the determination result of the appropriateness determination section 224 is 'appropriate,' the transmission power is used in an actual data writing process.

The AGC parameter acquisition section 227 reads a plurality of RFID tags at the position of the manually set position value Pos by receiving response signals in response to a write signal of a specific transmission power level and acquires AGC parameters P with respect to readable RFID tags.

The appropriateness determination section 224 acquires the top two AGC parameters from the AGC parameters acquired by the AGC parameter acquisition section 227 and sets the largest AGC parameter to be a first AGC parameter (P=AGC1) and a second largest AGC parameter to be a second AGC parameter (P=AGC2). The calibration values are determined to be appropriate when the difference of the first and second AGC parameters is larger than a specific value, and the value of the manually set AGC parameter P is smaller than the first AGC parameter and greater than the second AGC parameter.

When the calibration value is determined to be 'appropriate,' a communication with a target RFID tag in which data is to be written is enabled and a communication with other RFID is disenabled.

When the calibration value is determined to be 'appropriate,' the AGC parameter setting section 228 sets the AGC parameter with which the ACG circuit 46 adjusts the intensity of the response signals.

Figure 6:
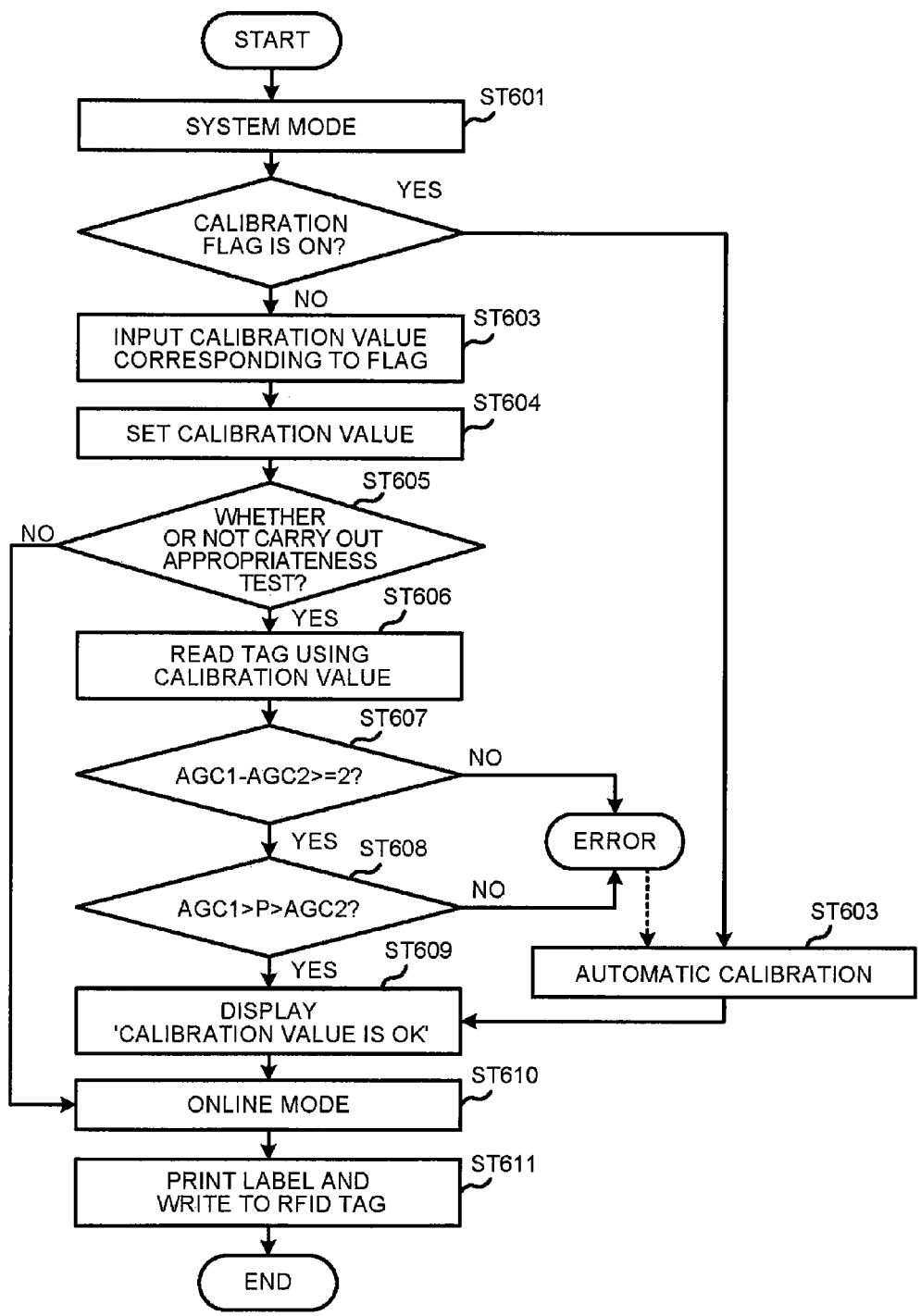
FIG. 6 is a flowchart of a calibration method for the RFID tag writing system according to the embodiment.

The calibration process of the RFID tag writing system with the above-mentioned configuration is described with reference to the flowchart shown in FIG. 6. Additionally, the calibration value database 211 indicating calibration values with respect to each label item number is described in FIG. 7.

First, in order to carry out a calibration in ACT ST601, a user selects a calibration flag indicating whether to use an automatic calibration value or to manually set a calibration value using a host device or operation panel connected with a communication interface by selecting a system mode.

It is determined in ACT ST602 whether or not the calibration flag is on. If the calibration flag is on (Yes in ACT ST602), then ACT ST603 is executed to carryout an automatic calibration. Further, calibration values are acquired when the automatic calibrations are ended.

If the calibration flag is off (No in ACT ST602), the user can manually input calibration values based on the calibration value database 211 shown in FIG. 7 (ACT ST603).

As shown in FIG. 7, a gain setting value P (AGC parameter), a transmission power S, and a position value F with respect to each of the label item numbers are recorded in the calibration value database 211, and the optimal calibration value database 211 is stored in the ROM 21*a* for each RFID tag writing system at a time of factory shipment. Further, when the calibration values are set through the communication interface 20, the calibration value database 211 may be located in a storage area at the side of the host device. Further, calibration values for a RFID label corresponding to a new item number may be added.

The user can set a calibration value by selecting an item number of the RFID label in which write data is to be written. For example, with respect to a label with a label item number "1," a gain setting value P '8,' a transmission power S '6,' and a position value F '6 mm' can be set as calibration values (ACT ST604).

In ACT ST605, the user can select whether or not to carry out an appropriateness test for the set calibration values. If it is determined not to carry out an appropriateness test for the set calibration values (No in ACT ST605), then ACT ST610 is executed to switch the mode to an online mode. Then, the writing to the RFID tag is carried out, and a label printing is carried out (ACT ST611).

If it is determined to carry out an appropriateness test for the calibration values (Yes in ACT ST605), the RFID tags 4 which are in the readable range when certain transmission power value S and position value F are manually set are read out (carries out tag read), and the top two AGC parameters are acquired (ACT ST606).

For example, in FIG. 3, if the AGC parameter of the RFID tag 4*b* is 8, the AGC parameter of the RFID tag 4*a* is 2, and the AGC parameter of the RFID tag 4*c* is 3, then the maximum AGC parameter is that of the RFID tag 4*b*, i.e., 8, and therefore, 8 is set as AGC 1. Further, as the second greatest AGC parameter is that of the RFID tag 4*c*, i.e., 3, and therefore, 3 is set as AGC 2. Further, if there is only one readable RFID tag, AGC2 is set to be 0.

The difference of AGC1 and AGC2 is calculated in ACT ST 607. ACT ST608 is executed if the difference of AGC1 and AGC 2 is larger than a specific value (Yes in ACT ST607).

Further, it is determined in ACT ST608 whether or not the gain setting value P of the calibration values is smaller than AGC1 and greater than AGC2. If the gain setting value P exists between AGC1 and AGC2 (Yes in ACT ST608), then it is determined that the calibration values are appropriate, and information 'OK' is displayed on the operation panel (ACT ST609). Then, the mode is switched to an online mode (ACT ST610), and the writing to a RFID is carried out and the label printing is carried out (ACT ST611).

Further, herein, the specific value of the difference between AGC1 and AGC2 refers to a value enabling the RFID tag 4*b* having AGC1 readable and the RFID tag 4*c* having AGC2 unreadable when the gain setting value P is set on the AGC circuit 46. Here, the specific value is set to be 2 in the flowchart of FIG. 6. However, in the case where the level of the AGC parameters is measured by 10 grades, if the difference between AGC1 and AGC2 is above 2 grades, then the levels of the AGC parameters are distinguished in such a manner that the response intensity from the RFID tag has enough difference and the substantially central integer value of can be set as the gain setting value P.

If the result of either of ACT ST607 and ACT ST608 is 'No,' then the manually set calibration value is determined as an inappropriate value, and an error is displayed on the operation panel (ACT ST612). Further, when there is an error, the flow proceeds to an automatic calibration (ACT ST603), as shown by the dashed arrow.

Calibration values can be set manually according to the aforementioned embodiment. A determination of whether or not the set calibration values are appropriate can be further made. As a result, the problem that it cannot be determined whether or not the set value is appropriate without carrying out a tag writing can be solved, especially when it is desired to shift the calibration value slightly from the currently-set or previously-set values. Besides, the appropriateness determination enables the communication with a target RFID tag in which write data is to be written and disenables the communication with the other RFID tags, and therefore the occurrence of an error writing can be determined.

While certain embodiments have been described, these embodiments have been presented by way of example only, and are not intended to limit the scope of the inventions.

For example, the margin of the set calibration values calculated by changing a position value, a transmission power value, and a gain setting value can be determined in the appropriateness determination action.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A RFID tag writing system comprising:
   an antenna configured to transmit a write signal towards a plurality of RFID tags and receive response signals from the RFID tags;
   a storage unit for storing a calibration table containing a plurality of receiving conditions for processing the response signals, the receiving condition including a gain level for adjusting at least a portion of intensities of the response signals; and
   a controller configured to:
   set a mode of the RFID writing system as either a manual mode or an auto mode;
   if the manual mode is set, allow a user of the RFID tag writing system to select a receiving condition from the calibration table, control the antenna to transmit the write signal with a transmission power determined from the calibration table, set the gain level to an initial gain level determined from the calibration table, adjust intensities of the response signals so that the response signals are at a predetermined level by adjusting the gain level, and determine whether or not the gain level selected by the user is appropriate to select a response signal from a target RFID tag, by comparing the gain level selected by the user with a first gain level and a second gain level, the first gain level corresponding to a largest intensity response signal and the second gain level corresponding to a second largest intensity response signal; and if the auto mode is set, determine an optimum receiving condition to select the response signal from the target RFID tag.

2. The RFID tag writing system according to claim 1, wherein
the controller is further configured to change the mode of the RFID writing system to the auto mode, if the controller determines that the receiving condition selected by the user is not appropriate.

3. The RFID tag writing system according to claim 1, wherein
the controller is further configured to allow the user to select a writing condition of transmitting the write signal if the manual mode is set, and to determine an optimum writing condition for selectively writing data in the target RFID tag if the auto mode is set.

4. The RFID tag writing system according to claim 3, wherein
the optimum writing condition includes at least an optimum position of the target RFID tag for selectively writing data therein.

5. A RFID tag writing system comprising:
an antenna configured to transmit a write signal towards plural RFID tags and receive response signals from the RFID tags;
a storage unit for storing a calibration table containing a plurality of writing conditions according to which the write signal is transmitted, the writing condition including a position of a target RFID tag for selectively writing data therein; and
a controller configured to:
set a mode of the RFID writing system as either a manual mode or an auto mode;
if the manual mode is set, allow a user of the RFID tag writing system to select a writing condition from the calibration table, control the antenna to transmit the write signal with a transmission power determined from the calibration table, set a gain level for adjusting at least a portion of intensities of the response signals to an initial gain level determined from the calibration table, adjust intensities of the response signals so that the response signals are at a predetermined level by adjusting the gain level, and determined whether or not the writing condition selected by the user is appropriate to selectively write data in the target RFID tag by determining whether or not a difference between a first gain level and a second gain level is equal to or more than a predetermined value, the first gain level corresponding to a largest intensity response signal and the second gain level corresponding to a second largest intensity response signal; and
if the auto mode is set, determine an optimum writing condition to selectively write data in the target RFID tag.

6. The RFID tag writing system according to claim 5, wherein
the controller is further configured to change the mode of the RFID writing system to the auto mode, if the controller determines that the receiving condition selected by the user is not appropriate.

7. A method of writing in a RFID tag, comprising:
setting a mode of writing in the RFID tag as either a manual mode or an auto mode;
if the manual mode is set, transmitting a write signal towards a plurality of RFID tags according to calibration values selected from a calibration table containing a plurality of sets of calibration values, setting a gain level for adjusting at least a portion of intensities of response signals from the RFID tags based on the calibration values, and determining whether or not the calibration values are appropriate to selectively write data in the target RFID tag by determining whether or not a difference between a first gain level and a second gain level is equal to or more than a predetermined value, the first gain level corresponding to a largest intensity response signal and the second gain level corresponding to a second largest intensity response signal; and
if the auto mode is set, determining new calibration values for selectively writing data in a target RFID tag and transmitting a write signal according to the new calibration values.

8. The method of claim 7, further comprising:
processing the response signals according to the calibration values if the manual mode is set;
processing the response signals according to the new calibration values if the auto mode is set.

9. The method of claim 8, wherein
the response signals are processed by adjusting intensities of the response signals according to the gain level set in either the manual mode or the auto mode.

* * * * *